US012207704B2

(12) United States Patent
Bertrand

(10) Patent No.: US 12,207,704 B2
(45) Date of Patent: Jan. 28, 2025

(54) FOOTWEAR FOR INVERSION EXERCISES

(71) Applicant: Nathan Bertrand, Jamaica, NY (US)

(72) Inventor: Nathan Bertrand, Jamaica, NY (US)

( * ) Notice: Subject to any disclaimer, the term of this patent is extended or adjusted under 35 U.S.C. 154(b) by 98 days.

(21) Appl. No.: 17/958,552

(22) Filed: Oct. 3, 2022

(65) Prior Publication Data

US 2024/0108095 A1 Apr. 4, 2024

(51) Int. Cl.
*A43B 5/18* (2006.01)
*A61H 1/02* (2006.01)

(52) U.S. Cl.
CPC ............. *A43B 5/18* (2013.01); *A61H 1/0229* (2013.01); *A61H 2201/1642* (2013.01); *A61H 2201/165* (2013.01); *A61H 2203/0493* (2013.01)

(58) Field of Classification Search
CPC .. A43B 5/18; A61H 1/0229; A61H 2201/165; A61H 2201/1642; A61H 2203/0493
USPC .................................................... 36/113, 114
See application file for complete search history.

(56) References Cited

U.S. PATENT DOCUMENTS 757,983 A * 4/1904 Vaile .................... A63B 21/065 36/85
993,251 A * 5/1911 Howards .............. A43B 1/0036 36/137
1,059,284 A * 4/1913 Dennis ................... A43C 15/06 36/72 A
1,990,970 A * 2/1935 Wood ................... A43B 19/005 36/132
1,997,139 A * 4/1935 Gardener ............... A63B 22/20 36/114
2,114,790 A * 4/1938 Venables ............ A63B 21/4001 482/79
2,214,052 A * 9/1940 Good ................. A63B 21/4015 482/79
2,484,389 A * 10/1949 Schatz ................... A43C 15/09 182/201
3,343,836 A * 9/1967 James, Jr. ............ A63B 21/065 482/79
3,380,447 A * 4/1968 Martin ................. A61H 1/0218 601/27
4,515,152 A * 5/1985 Teeter .................. A61H 1/0218 602/36
4,523,582 A * 6/1985 Barber ................. A61H 1/0218 602/36
4,565,370 A * 1/1986 Christianson ........ A61H 1/0218 D24/188
4,690,133 A * 9/1987 George ................ A61H 1/0218 601/35
5,255,452 A * 10/1993 Jackson ................... A43B 3/00 36/1
5,398,970 A * 3/1995 Tucky .................. A43B 5/1633 280/841

(Continued)

*Primary Examiner* — Jocelyn Bravo
(74) *Attorney, Agent, or Firm* — Stanzione & Associates, PLLC; Patrick Stanzione

(57) ABSTRACT

An inversion footwear to enable a human to hang in an inverted position from an elevated bar or other elevated device. The inversion footwear can include either a padding at a front upper portion of the inversion footwear, a hook-like extension at a back of the inversion footwear, or a hook at a bottom of the inversion footwear can be used to grip the elevated bar or other elevated device to secure the human wearing the inversion footwear thereto while hanging in an inverted position.

10 Claims, 10 Drawing Sheets

(56) References Cited

U.S. PATENT DOCUMENTS

| | | | | |
|---|---|---|---|---|
| 5,935,047 | A * | 8/1999 | Cawley | A63B 21/065 482/79 |
| 6,270,468 | B1 * | 8/2001 | Townsend | A61F 5/0111 36/114 |
| 6,319,215 | B1 * | 11/2001 | Manor | A61H 9/0078 601/149 |
| 6,684,531 | B2 * | 2/2004 | Rennex | A43B 13/184 36/31 |
| 6,935,991 | B1 * | 8/2005 | Mangino | A61H 1/0237 36/140 |
| 7,287,340 | B2 * | 10/2007 | Talbott | A43B 7/1435 36/114 |
| 8,622,879 | B1 * | 1/2014 | Ihli | A63B 21/4015 482/127 |
| 10,543,110 | B2 * | 1/2020 | Piercy | A61F 2/60 |
| 11,608,099 | B1 * | 3/2023 | Gholston | B62B 5/00 |
| 2002/0133106 | A1 * | 9/2002 | Peled | A43B 7/141 601/149 |
| 2010/0210980 | A1 * | 8/2010 | Kudoh | A61H 3/008 601/34 |
| 2012/0253254 | A1 * | 10/2012 | Rocklin | A61H 1/0218 602/32 |
| 2013/0031802 | A1 * | 2/2013 | Park | A43B 5/002 36/126 |
| 2018/0333321 | A1 * | 11/2018 | Traynor | A43C 19/00 |
| 2021/0052458 | A1 * | 2/2021 | Gutierrez Gonzalez | A61H 3/00 |
| 2021/0307949 | A1 * | 10/2021 | Ganti | A63B 21/065 |
| 2022/0015936 | A1 * | 1/2022 | Franco | A61F 5/0111 |

* cited by examiner

FOOTWEAR FOR INVERSION EXERCISES

STATEMENT REGARDING FEDERALLY SPONSORED RESEARCH OR DEVELOPMENT

Not applicable.

COPYRIGHT NOTICE

A portion of this disclosure contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever. 37 C.F.R 1.71(d).

BACKGROUND OF THE INVENTIVE CONCEPT

Field of the Invention

The present inventive concept relates to footwear to enable a user to perform inversion exercises on an elevated bar, rings or other elevated devices. More particularly, but not exclusively, this inventive concept relates to footwear to enable a user to perform inversion exercises on an elevated bar, rings or other elevated devices using either the top surface of a user's feet or heels of a user's feet.

Description of the Related Art

It is well known for athletic individuals to strengthen their arms and upper bodies by hanging from an elevated bar, rings or other elevated devices by their arms, and building strength in the arms and upper bodies by pulling themselves up to the bar or rings with the use of their arms, lats and pectoral muscles while holding onto the elevated bar, rings or elevated other devices with their hands. However, it is a much more complex task for a human to hang from an elevated bar, rings or other elevated devices in an inverted position since holding onto an elevated bar, rings or other elevated devices with one's feet is very difficult without the use of fingers.

U.S. Pat. No. 4,523,582 by Barber describes a device for suspending the human body in an inverted position. This device requires a re-enforcing member located in the heel-arch area of a shoe 52. More specifically, this device by Barber includes a hook member 60 connected to a shoe at tabs 54,55. The hook member 60 is also connected to a pair of linkage members 63,64, which are connected to a heel portion of the shoe 52. The hook member 60 hooks upward at a top portion of the shoe 52 to engage with an elevated bar while a human wearing the shoe 52 is inverted upside down while wearing the shoe 52. With the shoe 52 by Barber a human can hang upside down by hooking the hook 60 onto an elevated bar. However, once the hook 60 is hooked onto the bar the shoe(s) 52 are permanently positioned on the bar, and removal of the shoe 52 from the bar is a task that requires having to unhook the hook 60 one foot at a time, and the removal of the second foot (or the only foot) hooked onto the bar requires ones hands to grab onto the bar and hold oneself up on the bar while the hook 60 is attempted to be removed from the bar.

There is a need for footwear that provides a feature for a human to be able to hang from an elevated bar (or rings or other elevated devices) in an inverted position quickly by engaging the elevated bar with a top portion of the feet while the feet are placed in a flexed position such that the footwear can remain engaged with the elevated bar while the human performs inverted exercises, such that the footwear can quickly disengage with the elevated bar by simply unflexing the feet wearing the footwear.

There is also a need for footwear that provides a feature for a human to be able to hang from an elevated bar (or rings or other elevated devices) in an inverted position quickly by engaging the elevated bar with a heel of the feet while the feet wearing the footwear are placed in a toe-pointed position such that the heels of the feet can remain engaged with the elevated bar while the human performs inverted exercises, such that the footwear can quickly disengage with the elevated bar by simply flexing the feet wearing the footwear.

There is also a need for footwear that provides a feature for a human to be able to hang from an elevated bar in an inverted position by engaging the elevated bar with the bottom of the feet while the feet wearing the footwear are placed in a toe-pointed position, such that the footwear includes a hook at a bottom thereof which can quickly engage with and disengage from the elevated bar by simply sliding the hook onto and off the elevated bar.

SUMMARY OF THE INVENTIVE CONCEPT

The present general inventive concept provides special inversion footwear to enable a user to perform inversion exercises on an elevated bar, elevated rings or other elevated devices by using the top surface (or surfaces) of a user's feet or heels (or heels) of a user's feet or hook disposed at a bottom of the footwear.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a footwear for suspending a human in an inverted position on an elevated bar or elevated device, comprising: an outsole formed of a rigid material and including a toe shell to cover toes of a human, an open top portion, a hump extending outward from a rear portion thereof and forming an upward facing hook configured to hook onto an elevated bar or device, and a strap groove formed within a bottom thereof and disposed approximately where the human's arch of a foot rests when wearing the footwear; an upper insert attached to the open top of the outsole and configured to receive a human's foot therein, the upper insert including: a first attachment device fixed to a left side thereof and a second attachment device fixed to a right side thereof; a thick protective padding disposed across a top section thereof adjacent to the toe shell of the outsole, a front traction grip disposed over the thick protective padding, an upper strap attached to a back thereof and configured to wrap around a topmost portion of the upper insert and including a fastening device to securely fasten the upper strap around a human's leg, a first lower strap attached to the back thereof directly below the upper strap, the first lower strap including a third attachment device fixed to an inner side thereof and configured to wrap around a left side of the upper insert, insert into the strap groove and attach to the first attachment device of the upper insert to strap a human's foot inside the upper insert; and a second lower strap attached to the back thereof directly below the upper strap, the second lower strap including a fourth attachment device fixed to an inner side thereof and configured to wrap around a right side of the upper insert, insert into the strap groove and attach to the second attachment device of the upper insert to strap a human's foot inside the upper insert.

In an exemplary embodiment, the upper insert may further comprise: an upper rear padding fixed to the back thereof and disposed over the upper, first lower and second lower straps; a lower rear padding fixed directly under the upper rear padding; a back traction grip fixed over the upper rear padding and the lower rear padding; and a heel traction grip fixed over the hook of the hump.

In another exemplary embodiment, the outsole may further comprise flexibility grooves formed on the bottom thereof and disposed approximately below the thick protective padding and front traction grip.

In still another exemplary embodiment, the upper insert may further comprise a light waffled patterned padding disposed between the front thick padding and an upper most portion of the upper insert.

In still another exemplary embodiment, the first lower strap includes a strap loop fixed at an outer side thereof opposite to the third attachment device and the second lower strap includes a strap loop fixed at an outer side thereof opposite to the fourth attachment device, the strap loops of the first and second lower straps being configured to receive the upper strap therethrough when the first lower strap is attached to the first attachment device and when the second lower strap is attached to the second attachment device.

In yet another exemplary embodiment, the first, second, third and fourth attachment devices can be all hook and loop type attachment devices.

In still another exemplary embodiment, the fastening device on the upper strap can include a hook and loop type attachment device and a buckle combination.

The foregoing and/or other features and utilities of the present general inventive concept may also be achieved by providing a footwear for suspending a human in an inverted position, comprising: an outsole formed of a rigid material and including a toe shell to cover toes of a human, an open top portion, an extension at a back thereof configured to hook onto an elevated bar when the outsole is inverted, and a strap groove formed across a width within a bottom thereof; an upper insert attached within the open top of the outsole and configured to receive a human's foot therein, the upper insert including: a first attachment device fixed to a left side thereof and a second attachment device fixed to a right side thereof; a thick protective padding disposed across a top section thereof adjacent to the toe shell of the outsole, a front traction grip disposed over the thick protective padding, an first strap attached at a middle thereof to a back of the upper insert and configured to wrap around left and right sides of the upper insert and including a ring at a first end thereof and a hook and loop type attachment at a second end thereof, the first strap configured to wrap around a human's leg and insert the second end through the ring and attach to itself to securely fasten the upper insert to a human's leg, a second strap attached at a middle thereof to the back of the upper insert directly below the first strap, the second strap including: a third attachment device fixed to an inner side of a first end thereof and configured to wrap around a left side of the upper insert, insert into the strap groove and attach to the first attachment device of the upper insert to strap a human's foot inside the upper insert; and a fourth attachment device fixed to an inner side of a second end thereof and configured to wrap around a right side of the upper insert, insert into the strap groove and attach to the second attachment device of the upper insert to strap a human's foot inside the upper insert.

In an exemplary embodiment, the upper insert may further comprise: an upper rear padding fixed to the back thereof and disposed over the middle of the first and second straps; a lower rear padding fixed directly under the upper rear padding; a back traction grip fixed over the upper rear padding and the lower rear padding; and a heel traction grip fixed over the outsole extension.

In another exemplary embodiment, the first, second, third and fourth attachment devices can be all hook and loop type attachment devices.

The foregoing and/or other features and utilities of the present general inventive concept may also be achieved by providing a footwear for suspending a human in an inverted position, comprising: a molded outsole shell having an open top portion and including: at least two buckles which extend across a top portion to securely fasten a human's foot therein; a hook-like extension extending from a bottom thereof, the hook-like extension extending away from the bottom and curving towards a back of the outsole shell to be in parallel with the bottom of the outsole shell; and an upper insert attached within the outsole shell to receive a human's foot therein, the upper insert configured to be disposed under the buckles of the outsole shell such that a human's foot is buckled to the outsole shell while resting within the upper insert.

In an exemplary embodiment, the footwear can further comprise a padding disposed between the outsole shell and the upper insert, and between the upper insert and the buckles.

In another exemplary embodiment, the footwear can further comprise a traction grip attached to an outer surface and to the inner curving portion of the hook-like extension.

In another exemplary embodiment, the footwear can further comprise a rotatable member attached at a bottom of the outsole shell and configured to rotate downward to make contact with and support an end of the hook-like extension.

BRIEF DESCRIPTION OF THE DRAWINGS

These and/or other features and utilities of the present inventive concept will become apparent and more readily appreciated from the following description of the embodiments, taken in conjunction with the accompanying drawings of which.

Figure 1:
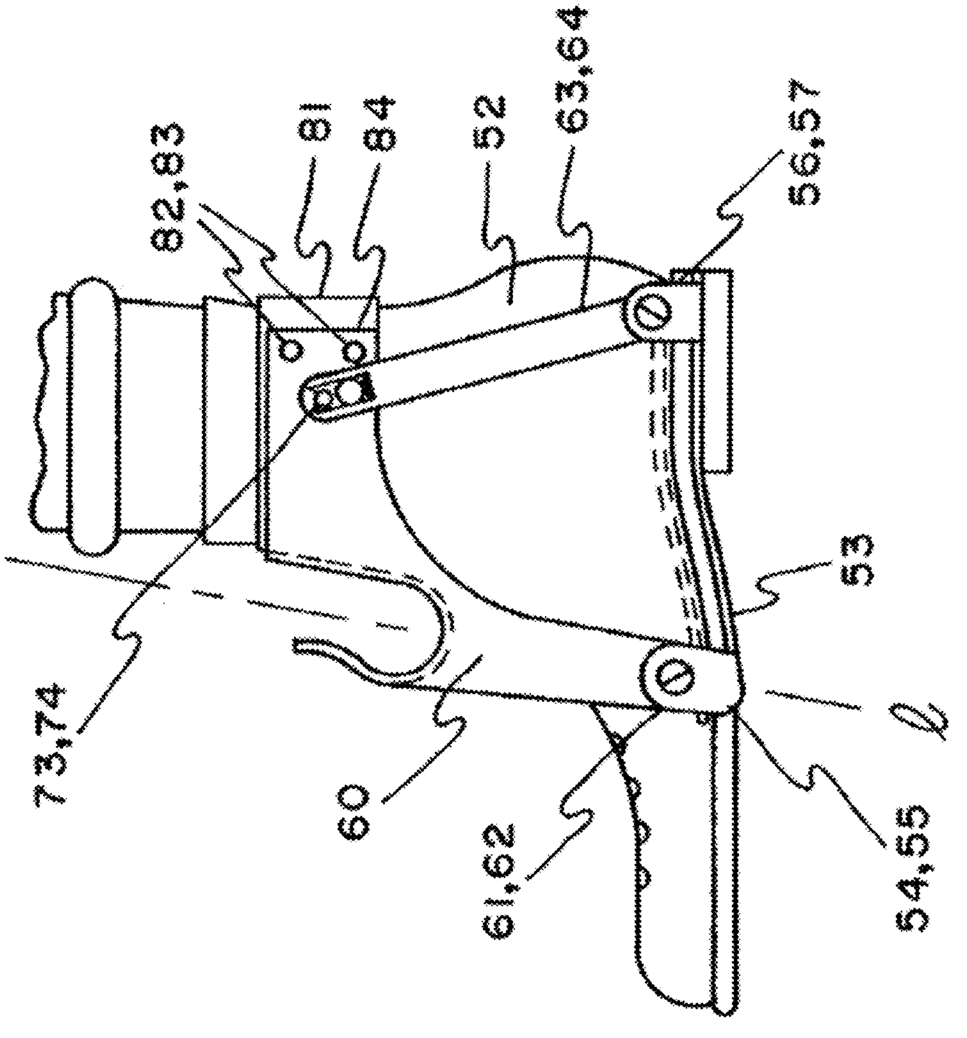
FIG. 1 (PRIOR ART)
FIG. 1 illustrates a conventional device for suspending a human body in an inverted position.

The drawings illustrate a few example embodiments of the present inventive concept, and are not to be considered limiting in its scope, as the overall inventive concept may admit to other equally effective embodiments. The elements and features shown in the drawings are to scale and attempt to clearly illustrate the principles of exemplary embodiments of the present inventive concept. In the drawings, reference numerals designate like or corresponding, but not necessarily identical, elements throughout the several views.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

It will be understood that although the terms "first" and "second" may be used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part can further include other elements, not excluding the other elements.

Hereinafter, one or more exemplary embodiments of the present general inventive concept will be described in detail with reference to the accompanying drawings.

Figure 2:
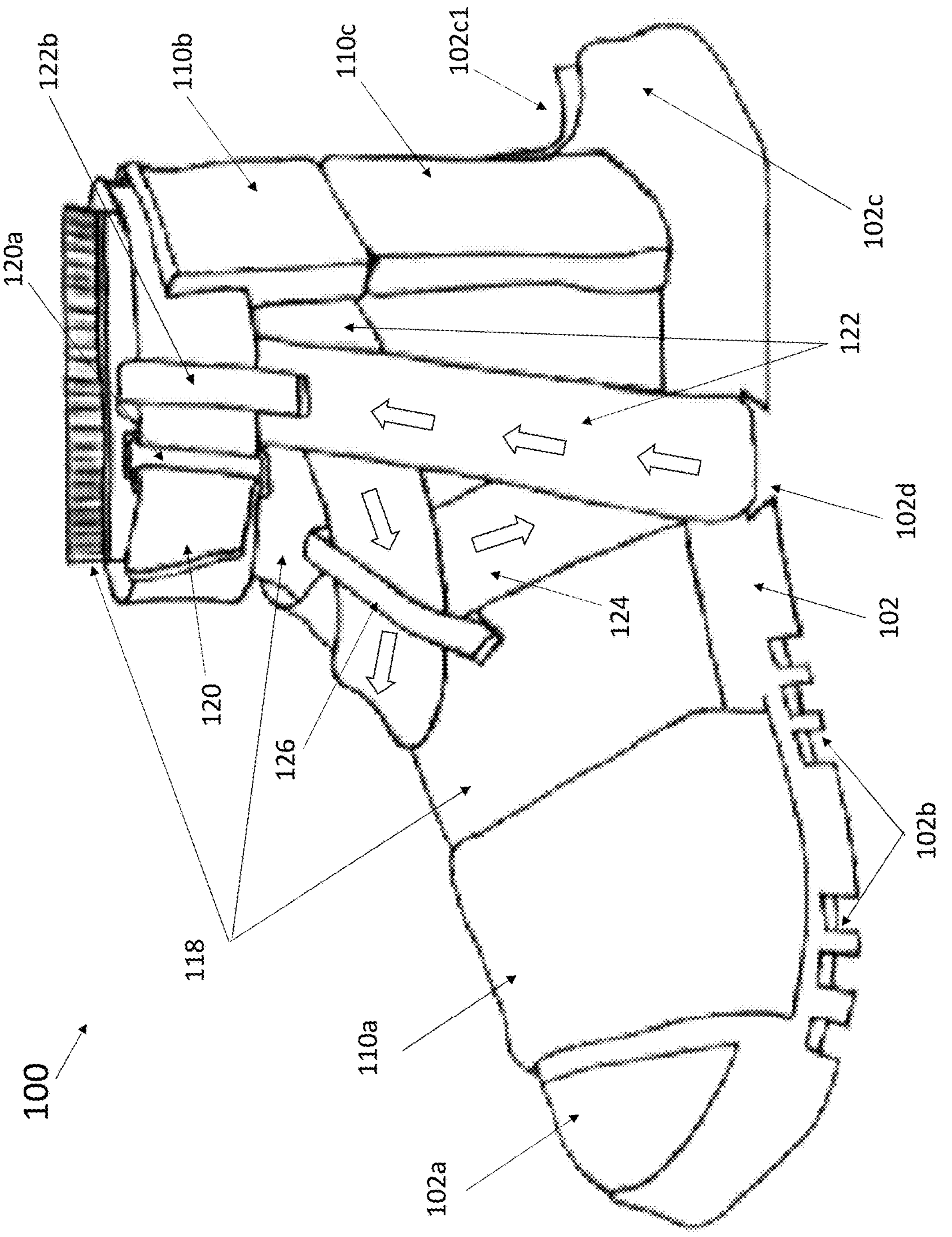
FIG. 2 illustrates a cross-sectional view of inversion footwear for suspending a human body in an inverted position, according to an example embodiment of the present inventive concept.

FIG. 2 illustrates a cross-sectional view of inversion footwear 100 for suspending a human body in an inverted position, according to an example embodiment of the present inventive concept. The inversion footwear 100 according to this example embodiment can include an outsole main body 102, which can be formed of a hard rubber such that the outsole main body 102 will withstand heavy weight of a user, and yet remain flexible enough to contour to different positions of a user's foot when inserted within the inversion footwear 100. The outsole main body 102 of the footwear 100 can include a toe shell 102*a* which curves upward and around to accommodate and protect toes of a user's feet when inserted within the inversion footwear 100. The outsole main body 102 can also include flexibility grooves 102*b* to allow the outsole 102 to flex upward when a foot of a user, while inserted within the inversion footwear 100, flexes upward, as described in more detail below.

The outsole 102 can also include a rear hump 102*c* which projects outward from a back portion of the inversion footwear 100. The rear hump 102*c* is configured to include a hooked portion 102*c*1, which can hook over an inverted bar. The rear hump 102*c* can have a thickness sufficient that the rear hump 102*c* is far less flexible than the other portions of the outsole 102. With a greater thickness of the rear hump 102*c* than the outsole main body 102, when the hump 102*c* is "hooked" over an elevated bar (see FIG. 5) or other elevated device, the hump 102*c* will remain in a rigid position.

The inversion footwear 100 according to this example embodiment can also include an upper insert 118, which is preferably formed of a material that is flexible enough for a user's foot to slide therein and be supported therein. The upper insert 118 can be made from a sock-like material, such as polyester, thick cotton, etc. It is to be noted that the upper insert 118 can be formed of any material that is equivalent to the materials listed above, while providing the flexibility and support necessary for a user to insert their feet therein in a secure fashion. The upper insert 118 is preferable sewn to the outsole 102.

Figure 6:
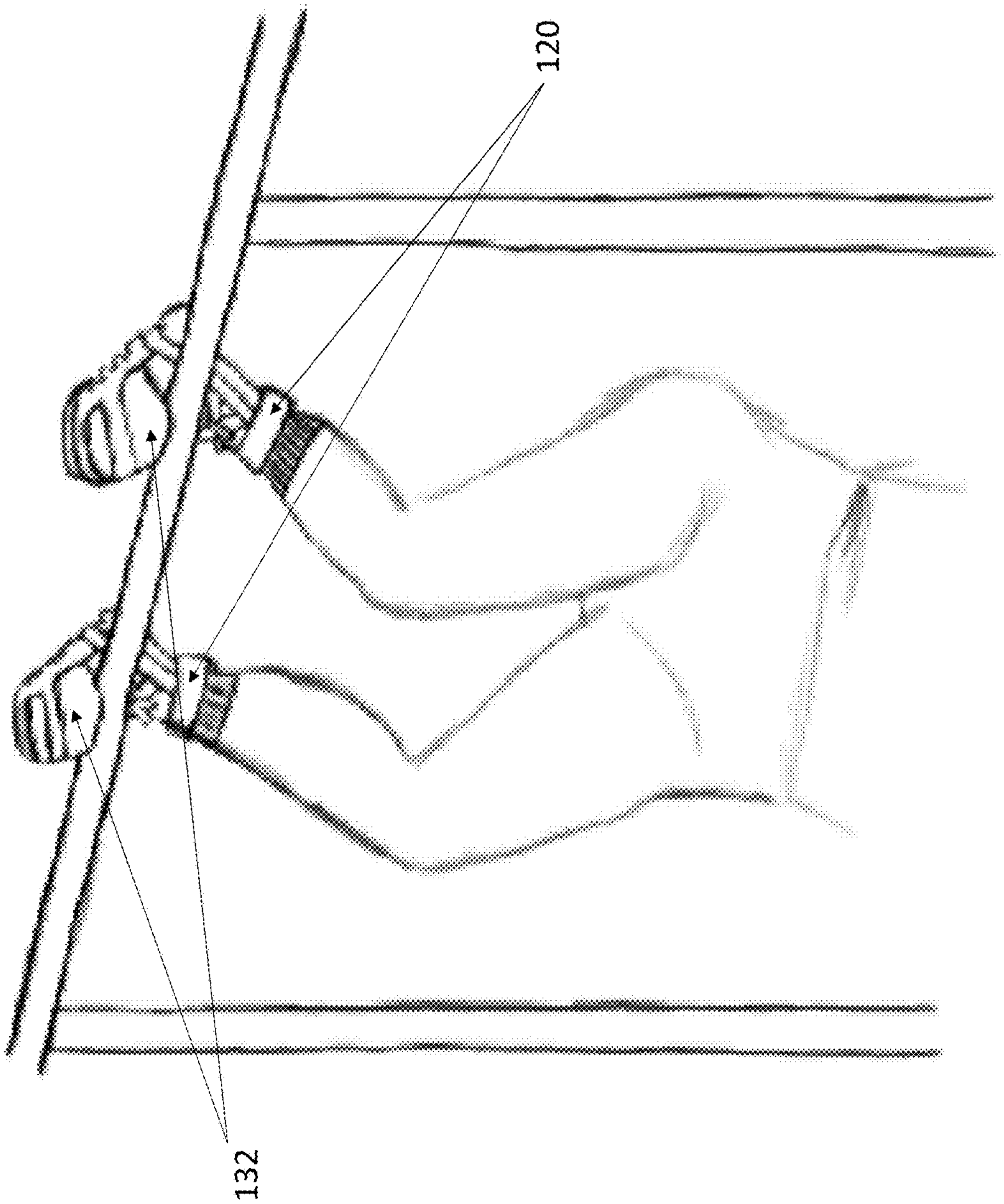
FIG. 6 illustrates another exemplary function of the inversion footwear of FIG. 3A, in accordance with example embodiment of the present inventive concept.

Still referring to FIG. 2, adjacent to the toe shell 102*a* and over the upper insert 118 can be fixed a thick protective padding 110*a*. The thick protective padding 110*a* is provided to protect a top portion of a user's foot within the inversion footwear 100 when a user is hanging in an inverted position from an elevated bar or other elevated device. More specifically, as illustrated in FIG. 6, the inversion footwear 100 is configured to allow a user to hang in an inverted position from an elevated bar at a point on the inversion footwear 100 where the thick protective padding 110*a* is disposed (upper traction grip 132, as described in more detail below) such that the user's feet will be protected from significant weight being applied to the upper portion of the user's foot in which the elevated bar is pressed.

At a rear portion of the upper insert 118 can be disposed an upper rear padding 110*b* and a lower rear padding 110*c*. The upper rear padding 110*b* and lower rear padding 110*c* is provided to protect a back portion of a user's feet when the user is hanging in an inverted position with the hooked portion 102*c*1 of the hump 102*c* being hooked over an elevated bar so the bar does not place too much direct force at the back portion of the user's feet.

Figure 3A:
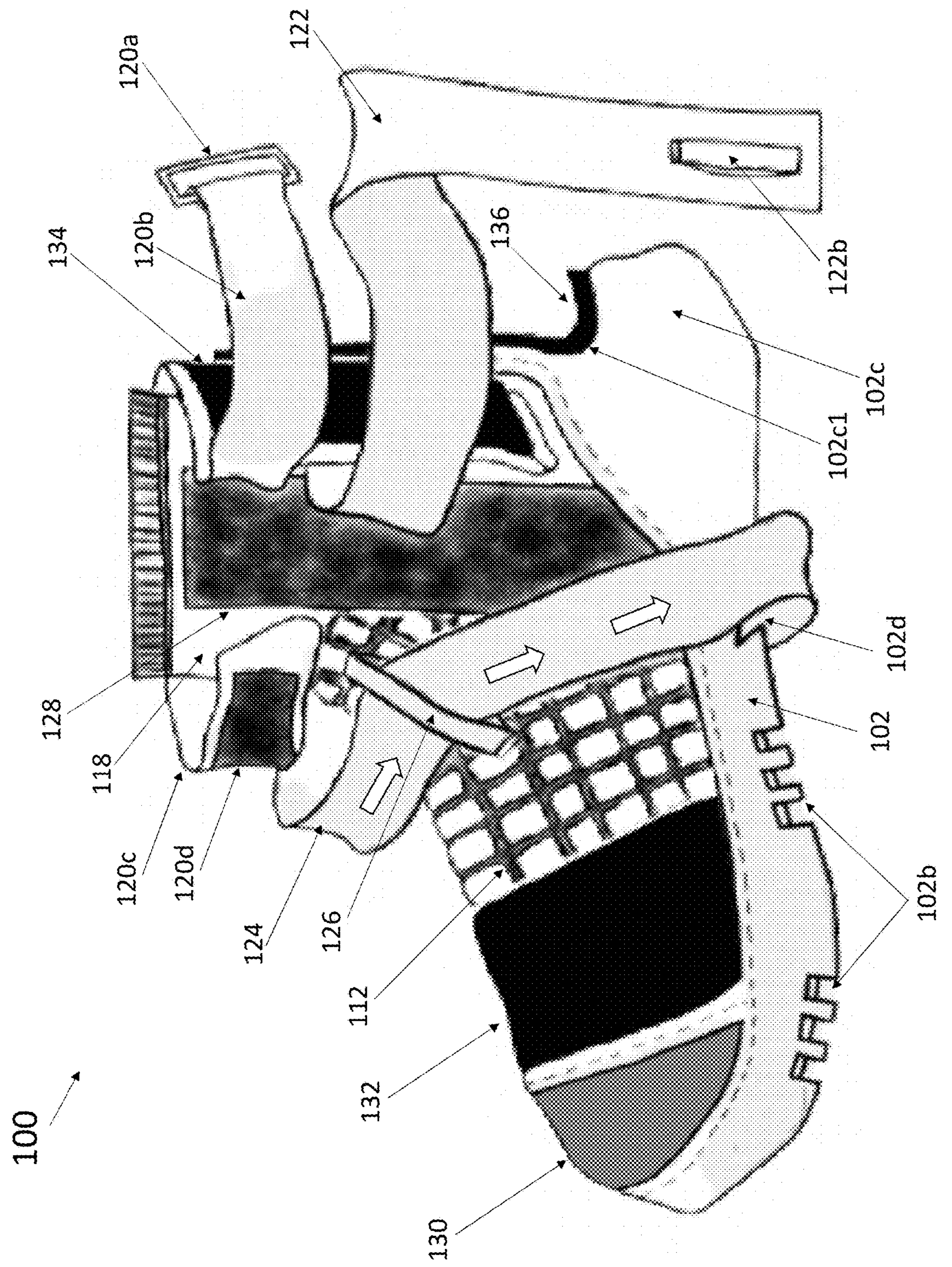
FIG. 3A illustrates a plan view of inversion footwear for suspending a human body in an inverted position, according to an example embodiment of the present inventive concept.

Referring to FIG. 3A, the upper insert 118 of the inversion footwear 100 is preferably covered in predetermined areas with sections of a traction grip material to provide traction from slipping off an elevated bar or other device. More specifically, a first "toe traction grip" 130 can be glued or sewn over the toe shell 102*a* to provide traction in case a user of the inversion footwear 100 ends up inverted while the toe shell 102*a* portion of the inversion footwear 100 is in direct contact with an elevated bar (or other elevated device). A second "upper traction grip" 132 can be glued or sewn over the thick protective padding 110*a* to provide traction when a user is hanging in an inverted position such that the upper traction grip 132 and the thick protective padding 110*a* area are both disposed directly over an elevated bar. With the upper traction grip 132 being disposed between the thick protective padding 110*a* and the elevated bar a user can easily maintain their position suspended in an inverted position with the upper traction grip 132 being gripped to the elevated bar. The traction grips 130 and 132 can be formed of any material that will provide added traction when placed against an object, such as an elevated bar. Examples of materials that can be used for the traction grips 130 and 132 include, for example leather, soft rubber, etc. It is to be noted that any material which provides the intended purpose of providing additional traction can be used for the traction grips 103 and 132.

Adjacent to the upper traction grip 132 can be provided a waffle padding 112. The waffle padding 112 is a protective padding which can be thinner than the thick protective padding 110*a* since the waffle padding 112 is only intended to be a backup padding in the case that the elevated bar is not correctly positioned under the thick protective padding 110*a*. The user will be encouraged to adjust the positioning of the inversion footwear 100 so that the elevated bar will be in direct contact with the second upper traction grip 132 disposed above the thick protective padding 110*a* since this position will provide more comfort and traction. In other words, the waffle padding 112 is disposed at a position to protect a user's feet in case the user hits the part of their feet (unintentionally) against an elevated bar at the area of the inversion footwear 100 adjacent to the upper traction grip 132, where the waffle padding 112 is disposed. The waffle padding 112 can be glued or sewn to the upper insert 118 at the position illustrated in FIG. 3A.

Still referring to FIG. 3A, over the upper rear padding 110*b* and the lower rear padding 110*c* can be disposed a third "back traction grip" 134 to cover the upper and lower rear padding 110*b*, 110*c* such that the back portion of a user's feet can gain traction against an elevated bar or other elevated device, if needed. The back traction grip 134 can be glued or stitched over the upper and lower rear padding 110*b*, 110*c*. Alternatively, the back traction grip 134 can be attached over the upper and lower rear padding 110*b*, 110*c* by any equivalent type of attachment that will provide the intended purpose thereof, which is to provide a secure attachment of the back traction grip 134 to the back portion of the inversion footwear 100.

Figure 3B:
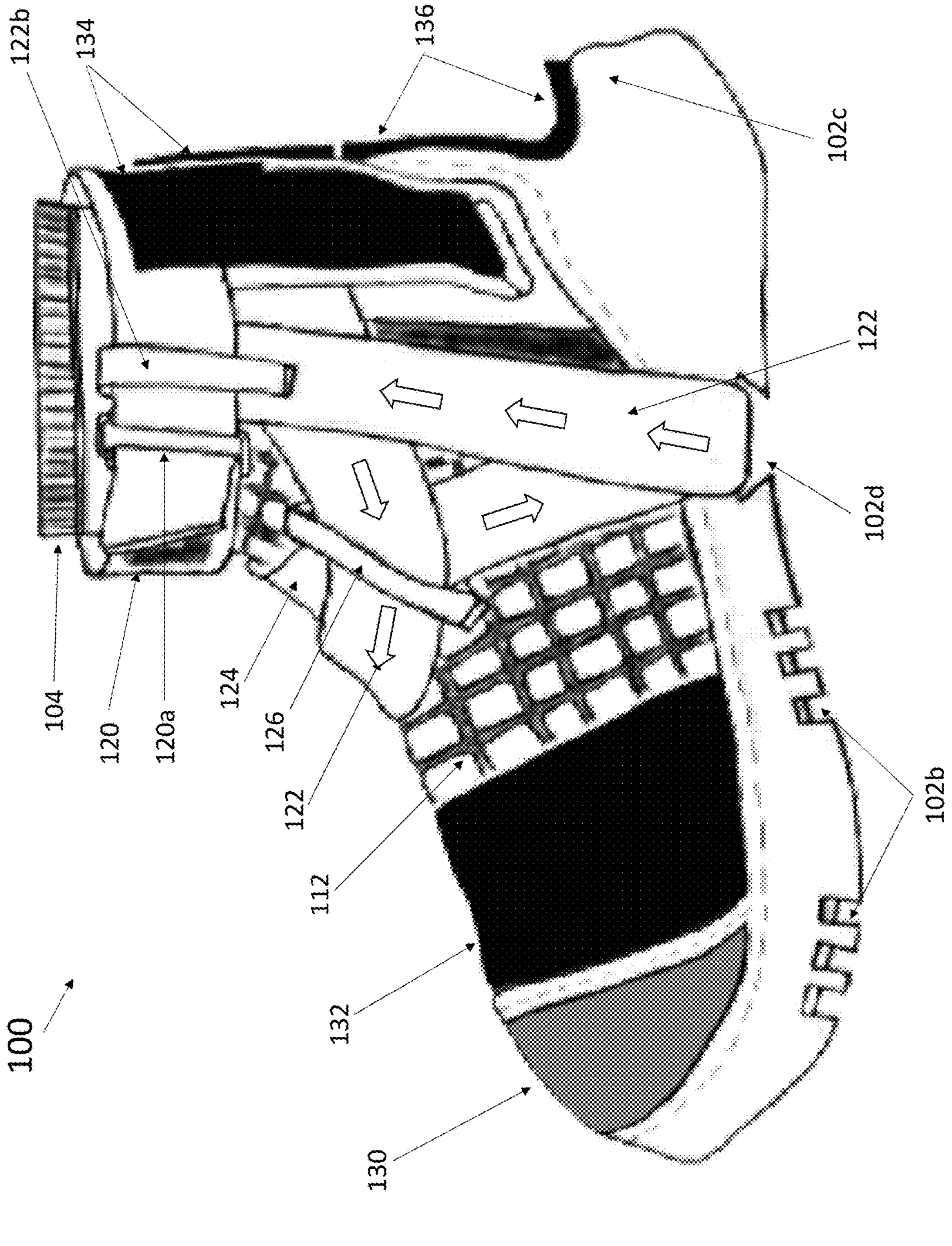
FIG. 3B illustrates another plan view of the inversion footwear for suspending a human body in an inverted position, according to the example embodiment of FIG. 3A.
Figure 5:
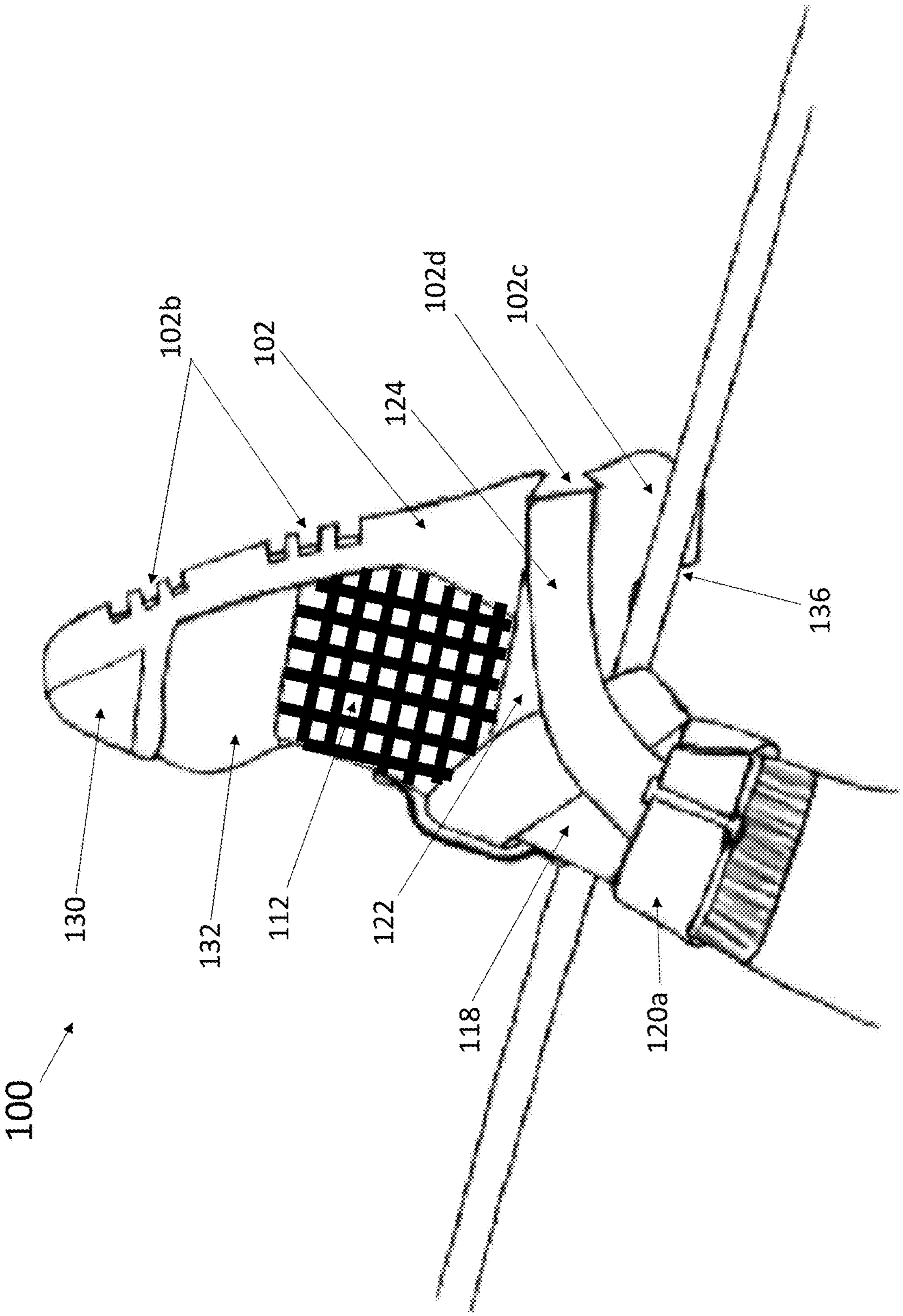
FIG. 5 illustrates an exemplary function of the inversion footwear of FIG. 3A, in accordance with example embodiment of the present inventive concept.

Referring to FIGS. 3A-3B and 5, a fourth "heel traction grip" 136 can be disposed over the hooked portion 102*cl* of the hump 102*c*. The fourth heel traction grip 136 can provide traction for the inversion footwear 100 against an elevated bar (or other elevated device) when a user is hanging in an inverted position with the hump 102*c* being hooked over the elevated bar (or other elevated device). As illustrated, the heel traction grip 136 is attached at the lower back portion of the inversion footwear 100 and over the hooked portion 102*cl* of the hump 102*c*. The heel traction grip 136 can be attached to the hooked portion 102*cl* of the outsole hump 102*c* by glue, stitching, or any other form of attachment which will securely attach the heel traction grip 136 to the hooked portion of the outsole hump 102*c*. The heel traction grip 136 can be formed of any material that will provide added traction when placed against an object, such as an elevated bar. Examples of materials that can be used for the traction grip 136 include, for example leather, soft rubber, etc. It is to be noted that any material which provides the intended purpose of providing additional traction can be used for the traction grip 136.

Figure 3C:
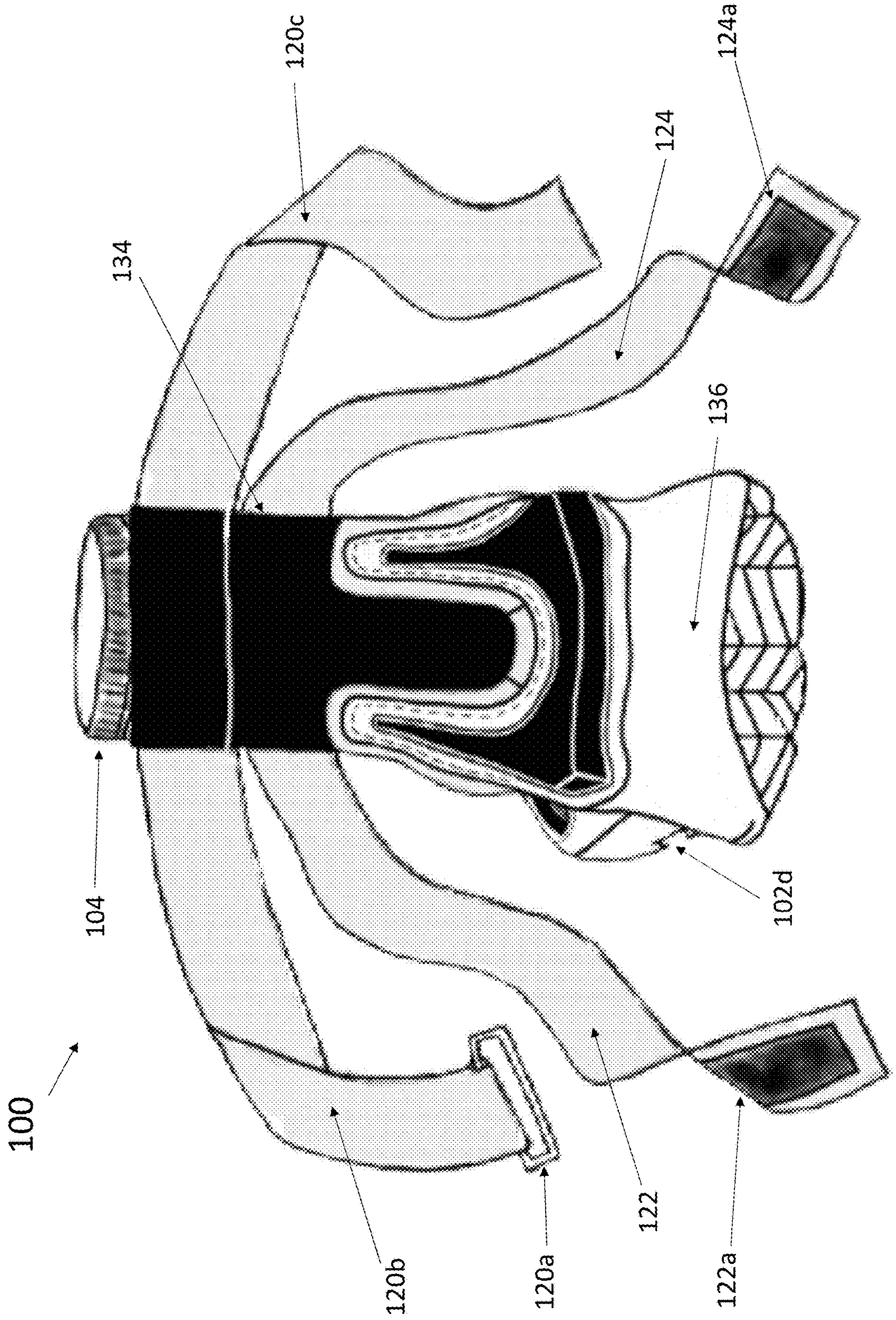
FIG. 3C illustrates a back view of the inversion footwear for suspending a human body in an inverted position, according to the example embodiment of FIG. 3A.

Referring to FIGS. 3A-3C, a first strap 120 can be disposed around the back portion of the inversion footwear 100 such that the first strap 120 is attached under the upper rear padding 110*b*. The first strap 120 preferably extends at both first and second portions 120*b* and 120*c* thereof around respective left and right sides of the inversion footwear 100. The first portion 120*b* of the first strap 120 can include a buckle 120*a* attached thereto. The second portion 120*c* of the first strap 120 can include a hook and loop type attachment 120*d* (i.e., Velcro®) sewn thereon. The second portion 120*c* and hook and loop type attachment 120*d* can be inserted through the buckle 120*a* and then folded over to attach to itself, as is a well-known function of a hook and loop type attachment. After a user's foot is fully inserted into the inversion footwear 100 the first strap 120 can be strapped, via the buckle 120*a* and the hook and loop attachment 120*d*, around the user's ankle area (slightly above the ankle).

Directly below the first strap 120 is preferably a second strap 122 and a third strap 124, wherein the second strap 122 can be attached at a first end thereof under the upper rear padding 110*b* of the inversion footwear 100, and is configured to extend around a left side of the inversion footwear 100. The third strap 124 can be attached at a first end thereof under the upper rear padding 110*b* of the inversion footwear 100, and is configured to extend around a right side of the inversion footwear 100. Second ends of both the second strap 122 and the third strap 124 can include a hook and loop type attachment 122*a*, 124*a* (see FIG. 3C) sewn on an inner side thereof. The second ends of the second strap 122 and the third strap 124 can be crossed over the front of the inversion footwear 100 and inserted through a strap loop 126, which can be fixed to the front portion of the inversion footwear 100 over the waffle padding 112. At this point the second strap 122 can be wrapped under the inversion footwear 100, placed in a strap groove 102*d* formed into a bottom of the outsole 102 approximately at a mid-section of the inversion footwear 100, and pulled back up the left side. The third strap 124 can be wrapped under the inversion footwear 100, placed in a strap groove 102*d* pulled back up the right side. Along both the left and right sides of the inversion footwear 100 can be attached a vertical hook and loop type attachment 128 (see FIG. 3A). Once the second ends of the second strap 122 and the third strap 124 are wrapped under the inversion footwear 100, fed into the strap groove 102*d* and pulled back up along respective sides of the inversion footwear 100, the respective hook and loop type attachments 122*a* and 124*a* can be attached to corresponding left and right vertical hook and loop type attachments 128 in order to tightly secure a user's foot within the inversion footwear 100. It is to be noted that the straps 120, 122 and 124 can be formed of a neoprene material, or any other material, such as for example, a strong cloth material, which will hold up to the weight of a human being hanging in an inverted position from the inversion footwear 100 while wearing the inversion footwear 100.

Figure 4:
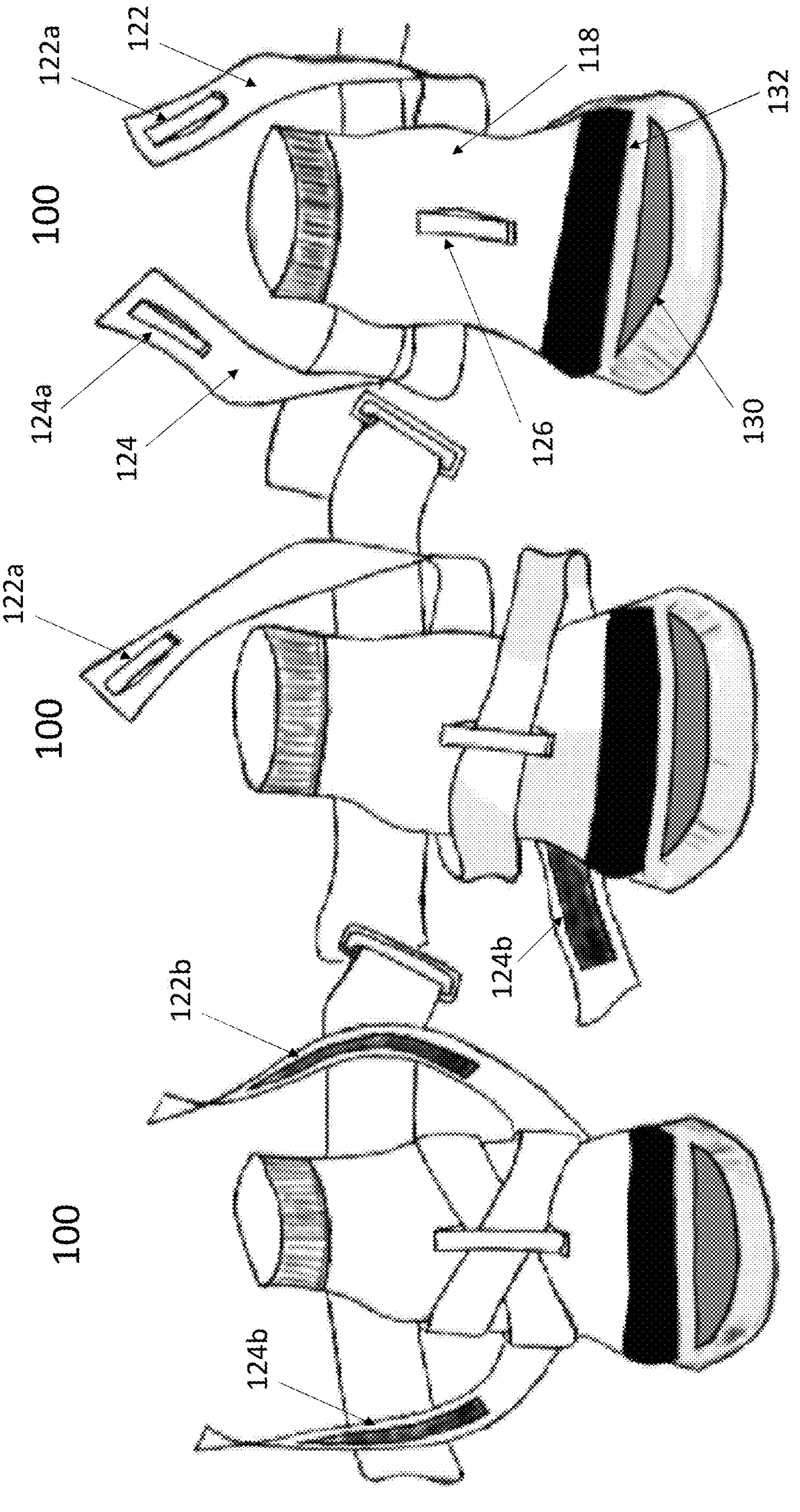
FIG. 4 illustrates operational steps of securing the inversion footwear of FIG. 3A to a foot of a human, according to an example embodiment.

Referring to FIGS. 3B and 4, in an example embodiment, both the second strap 122 and the third strap 124 can include a respective strap loop 122*b*, 124*b* attached at the respective second ends and on opposite sides from where the respective hook and loop type attachments 122*a*, 124*a* are sewn thereon. The strap loops 122*b*, 124*b* are configured to be disposed in horizontal alignment with the first strap 120 when the second and third straps 122, 124 are attached to the respective vertical hook and loop type attachments 128, such that the first portion 120*b* of the first strap 120 can be fed through the strap loop 122*b* and the second portion 120*c* of the first strap 120 can be fed through the strap loop 124*b* prior to fastening the first and second portions 120*b*, 120*c* of the first strap 120 together via the buckle 120*a* and hook and loop type attachment 120*d*.

With the inversion footwear 100 according to this example embodiment, once the user's feet are inserted therein and each of the straps 102, 122 and 124 are secured as described above, the user can safely invert themselves by either placing the traction grips 132 over an elevated bar (or other elevated device) and perform inversion squats, leg pullups, etc., or by placing the traction grips 136 over an elevated bar (or other elevated device) and perform inversion squats, leg pullups, etc.

Figure 7A:
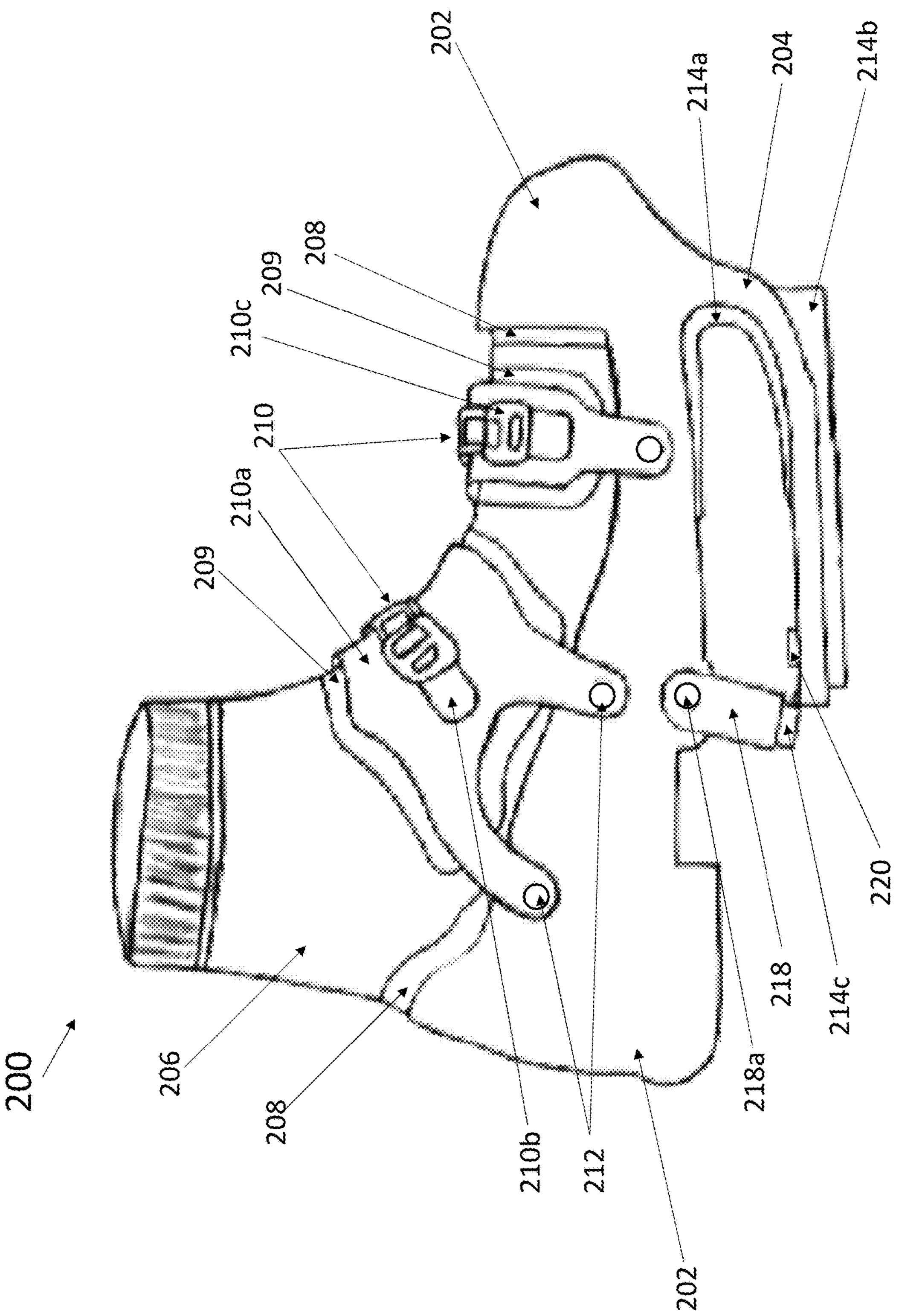
FIG. 7A illustrates a side view of inversion footwear for suspending a human body in an inverted position, according to another example embodiment of the present inventive concept.

FIG. 7A illustrates a side view of inversion footwear 200 for suspending a human body in an inverted position, according to another example embodiment of the present inventive concept. The inversion footwear 200 can have a hard-shell outsole 202 which forms a bottom portion of the inversion footwear 200 including a toe portion that covers a user's toes. The outsole 202 is preferably shaped to have an open top to receive an upper insert 206 therein. The hard-shell outsole 202 can be formed of a metal or hard plastic, injection molded urethane plastic, or other similar material, such as that used for the main body of inline skates.

The outsole 202 can also include a hook 204 which extends downward from a bottom front portion thereof and hooks back toward the back of the outsole 202 and in horizontal with a bottom of the outsole 202. The hook 204 is provided to allow a user wearing the inversion footwear 200 to hook onto an elevated bar and hang from the elevated bar in an inverted position, as is described in more detail below. The hook 204 can include a traction grip 214*a* disposed on an inner portion thereof to grip an elevated bar so that a user can have traction with respect to the elevated bar when performing inverted exercises thereon. Along an outer side of the hook 204 can be provided a traction grip 214*b* to provide traction for a user wearing the inversion footwear 200 while walking upright on a surface. The traction grips 214*a* and 214*b* can be formed of a rubber material so as to provide traction and to prevent damage to surfaces in which the traction grips come into contact with.

As pointed out above, an upper insert 206 is formed to be permanently inserted into the outsole 202. The upper insert 206 can be made from a sock-like material, such as polyester, thick cotton, etc. It is to be noted that the upper insert 206 can be formed of any material that is equivalent to the materials listed above, while providing the flexibility and support necessary for a user to insert their feet therein in a secure fashion. The upper insert 206 can be glued to the inner portion of the outsole 202. Inserted between the upper insert 206 and the outsole 202 can be provided a protective padding 208 to protect a user's feet from the hard inflexible outsole 202.

Figure 7B:
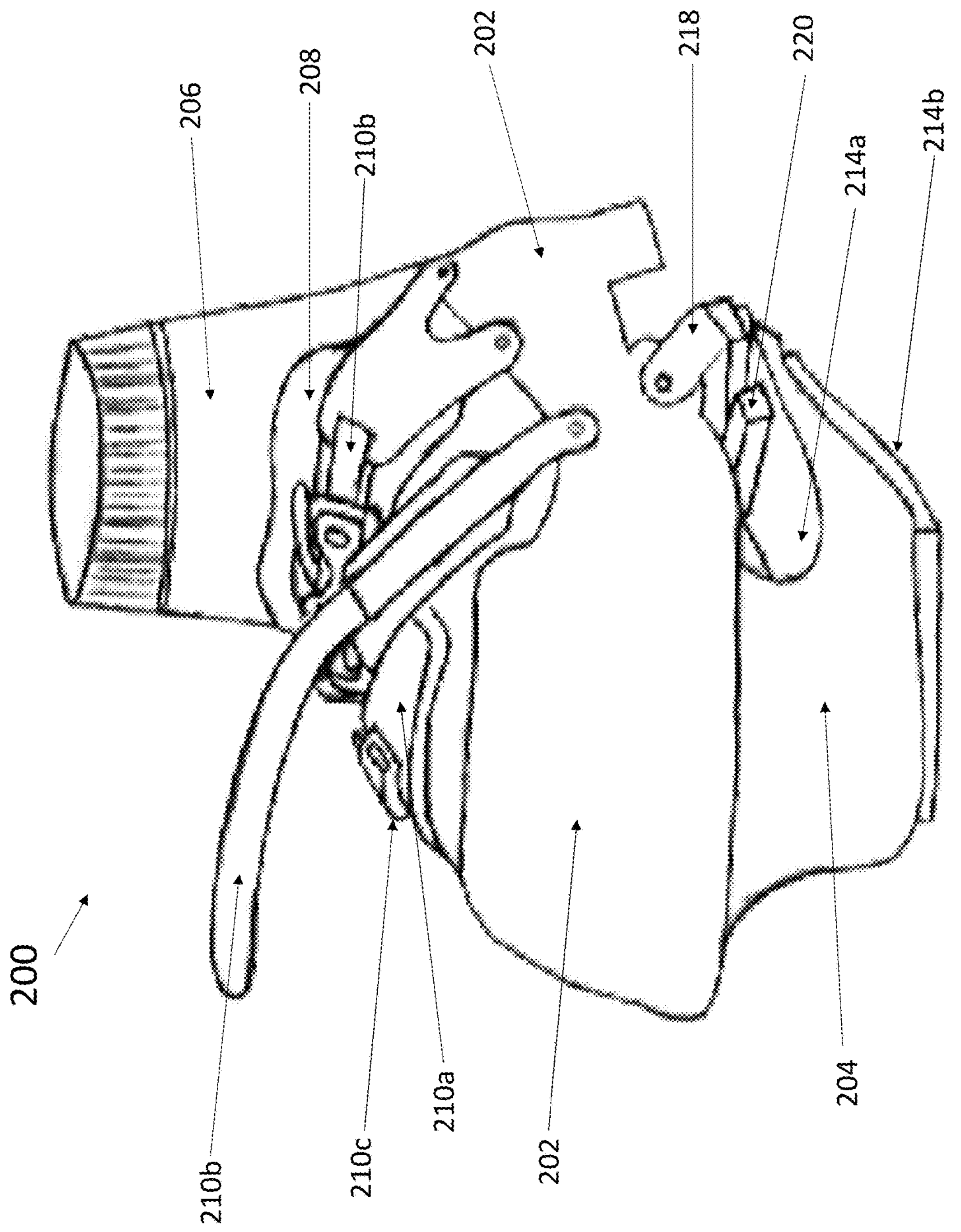
FIG. 7B illustrates a plan view of the inversion footwear according to the example embodiment of FIG. 7A.

Referring to FIGS. 7A and 7B, the inversion footwear 200 can also include a pair of buckle systems 210 to strap over the upper insert 206 to secure a user's foot within the inversion footwear 200. More specifically, each buckle system 210 can include a first strap 210*a* which is attached at a first end thereof to an outer side of the outsole 202 by rivets 212 or other equivalent attachment means and wraps across the upper insert 206. The first straps 210*a* can include a buckle 210*c* attached to a top surface thereof to receive a second strap therein. The buckle systems 210 can also include a second strap 210*b* which is attached at a first end thereof to an inner side of the outsole 202 and extends across the upper insert 206 and above respective first straps 210*a*. Second ends of the second straps 210*b* can be inserted into and buckled to corresponding buckles 210*c* attached to the first straps 210*a*. With this strapped configuration a user's foot will be securely held within the inversion footwear 200 when hanging upside down in an inverted position with the hook 204. It is to be noted that the straps 210*b* and buckles 210*c* can be formed of a hard plastic material, such as for example, polyurethane plastic, or fiberglass, or carbon fiber, or leather, or any other equivalent material which will hold up to the weight of a human hanging in an inverted position from the inversion footwear 200 while wearing the inversion footwear 200.

Attached to the upper insert 206 directly under both first straps 210*a* of the buckle systems 210 can be provided protective padding 209 to protect a user's foot from pressure by applied by the buckle systems 210 when the user is in an inverted position while wearing the inversion footwear 200. The protective paddings 209 can be attached to the upper insert 206 via stitching, glue, etc.

A bridge type device 218 can be rotatingly connected to the outsole 202 and configured to rotate downward and into contact with an end of the hook 204, thus providing a stable support to the end of the hook 204 when a user in standing upright in the inversion footwear 202. A first end of the bridge type device 218 can be bolted to the bottom middle portion of the outsole 202 via a bolt 218*a*. Attached at a second end of the bridge type device 218 can be provided a traction grip 214*c* to provide friction between the inner end of the hook 204 and the bridge type device 218. Also, a stopper 220 can be provided at the inner end of the hook 204 to limit an amount which the bridge type device 218 can swing/rotate into the inner opening of the hook 204.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A footwear for suspending a human in an inverted position on an elevated bar or elevated device, the footwear comprising:

- an outsole formed of a rigid material and including a toe shell configured to cover toes of a human, an open top portion, a hump extending outward from a rear portion of the outsole and forming an upward facing hook configured to hook onto an elevated bar or device, and a strap groove formed within a bottom of the outsole and disposed approximately where the human's arch of a foot rests when wearing the footwear;
- an upper insert attached to the open top portion of the outsole and configured to receive a human's foot therein, the upper insert including:
  - a first attachment device fixed to a left side of the upper insert and a second attachment device fixed to a right side of the upper insert;
  - a thick protective padding disposed across a top section of the upper insert adjacent to the toe shell of the outsole,
  - a front traction grip disposed over the thick protective padding,
  - an upper strap attached to a back of the upper insert and configured to wrap around a topmost portion of the upper insert and including a fastening device configured to securely fasten the upper strap around a human's leg, a first lower strap attached to the back of the upper insert directly below the upper strap, the first lower strap including a third attachment device fixed to an inner side of the first lower strap and configured to wrap around the left side of the upper insert, insert through the strap groove and attach to the first attachment device of the upper insert to strap a human's foot inside the upper insert; and a second lower strap attached to the back of the upper insert directly below the upper strap, the second lower strap including a fourth attachment device fixed to an inner side of the second lower strap and configured to wrap around the right side of the upper insert, insert through the strap groove and attach to the second attachment device of the upper insert to strap a human's foot inside the upper insert.

2. The footwear according to claim 1, wherein the upper insert further comprises:

an upper rear padding fixed to the back of the upper insert and disposed over the upper, first lower and second lower straps;

a lower rear padding fixed directly under the upper rear padding;

a back traction grip fixed over the upper rear padding and the lower rear padding; and a heel traction grip fixed over the hook of the hump.

3. The footwear according to claim 2, wherein the upper insert further comprises:

a light waffled patterned padding disposed between the thick protective padding and an upper most portion of the upper insert.

4. The footwear according to claim 1, wherein the outsole further comprises:

flexibility grooves formed on the bottom of the outsole and disposed approximately below the thick protective padding and the front traction grip.

5. The footwear according to claim 1, wherein the first lower strap includes a strap loop fixed at an outer side of the first lower strap opposite to the third attachment device and the second lower strap includes a strap loop fixed at an outer side of the second lower strap opposite to the fourth attachment device, the strap loops of the first and second lower straps being configured to receive the upper strap therethrough when the first lower strap is attached to the first attachment device and when the second lower strap is attached to the second attachment device.

6. The footwear according to claim 1, wherein the first, second, third and fourth attachment devices are all hook and loop type attachment devices.

7. The footwear according to claim 1, wherein the fastening device on the upper strap includes a hook and loop type attachment device and a buckle combination.

8. A footwear for suspending a human in an inverted position, the footwear comprising:

an outsole formed of a rigid material and including a toe shell configured to cover toes of a human, an open top portion, an extension at a back of the outsole configured to hook onto an elevated bar when the outsole is inverted, and a strap groove formed across a width within a bottom of the outsole;

an upper insert attached within the open top portion of the outsole and configured to receive a human's foot therein, the upper insert including:

a first attachment device fixed to a left side of the upper insert and a second attachment device fixed to a right side of the upper insert;

a thick protective padding disposed across a top section of the upper insert adjacent to the toe shell of the outsole, a front traction grip disposed over the thick protective padding, a first strap attached at a middle of the upper insert to a back of the upper insert and configured to wrap around left and right sides of the upper insert and including a ring at a first end of the first strap and a hook and loop type attachment at a second end of the first strap, the first strap configured to wrap around a human's leg and insert the second end through the ring and attach to itself to securely fasten the upper insert to a human's leg, a second strap attached at a middle of the upper insert to the back of the upper insert directly below the first strap, the second strap including:

a third attachment device fixed to an inner side of a first end of the second strap and configured to wrap around the left side of the upper insert, insert into the strap groove and attach to the first attachment device of the upper insert to strap a human's foot inside the upper insert; and a fourth attachment device fixed to an inner side of a second end of the second strap and configured to wrap around the right side of the upper insert, insert into the strap groove and attach to the second attachment device of the upper insert to strap a human's foot inside the upper insert.

9. The footwear according to claim 8, wherein the upper insert further comprises:

an upper rear padding fixed to the back of the upper insert and disposed over a middle of the first and second straps;

a lower rear padding fixed directly under the upper rear padding;

a back traction grip fixed over the upper rear padding and the lower rear padding; and a heel traction grip fixed over the extension of the outsole.

10. The footwear according to claim 9, wherein the first, second, third and fourth attachment devices are all hook and loop type attachment devices.

* * * * *